United States Patent
Liu et al.

(10) Patent No.: US 8,942,195 B2
(45) Date of Patent: Jan. 27, 2015

(54) METHOD AND ARRANGEMENT IN A WIRELESS COMMUNICATION SYSTEM

(75) Inventors: Yin Liu, Beijing (CN); Muhammad Kazmi, Bromma (SE); Rong Hu, Sollentuna (SE); Christian Bergljung, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 670 days.

(21) Appl. No.: 13/144,635

(22) PCT Filed: Nov. 23, 2009

(86) PCT No.: PCT/SE2009/051315
§ 371 (c)(1),
(2), (4) Date: Jul. 14, 2011

(87) PCT Pub. No.: WO2010/082888
PCT Pub. Date: Jul. 22, 2010

(65) Prior Publication Data
US 2011/0274092 A1  Nov. 10, 2011

Related U.S. Application Data

(60) Provisional application No. 61/144,530, filed on Jan. 14, 2009.

(51) Int. Cl.
*H04W 4/00* (2009.01)
*H04W 72/10* (2009.01)
*H04W 28/02* (2009.01)
(Continued)

(52) U.S. Cl.
CPC .......... *H04W 72/10* (2013.01); *H04W 28/0252* (2013.01); *H04W 28/0231* (2013.01); *H04W 72/087* (2013.01); *H04W 88/02* (2013.01); *H04W 88/08* (2013.01); *H04W 52/146* (2013.01); *H04W 52/243* (2013.01); *H04W 52/367* (2013.01); *H04W 52/242* (2013.01)
USPC ........................................................ 370/329

(58) Field of Classification Search
None
See application file for complete search history.

(56) References Cited

U.S. PATENT DOCUMENTS

2002/0027894 A1* 3/2002 Arrakoski et al. ............ 370/338
2007/0173260 A1    7/2007 Love et al.
(Continued)

FOREIGN PATENT DOCUMENTS

EP    0631397 A2    12/1994

OTHER PUBLICATIONS

Author Unknown, 3GPP TS 36.101 Version 8.0.0, pp. 1-45, Dec. 2007.*
(Continued)

*Primary Examiner* — Christopher Crutchfield
(74) *Attorney, Agent, or Firm* — Roger S. Burleigh

(57) ABSTRACT

Method and arrangement in a base station for scheduling physical resources in a transmission bandwidth to a user equipment served by the base station. The physical resources may be physical channels or radio resource blocks. Some physical resources within the transmission bandwidth are subjected to a performance requirement power restriction value. The method comprises scheduling physical resources based on the performance requirement power restriction value of the physical resources to be scheduled. Also, a method and arrangement in a user equipment for assisting a base station in scheduling physical resources in a transmission bandwidth to the user equipment is described.

13 Claims, 7 Drawing Sheets

(51) Int. Cl.
*H04W 52/36* (2009.01)
*H04W 72/08* (2009.01)
*H04W 88/02* (2009.01)
*H04W 88/08* (2009.01)
*H04W 52/14* (2009.01)
*H04W 52/24* (2009.01)

(56) References Cited

U.S. PATENT DOCUMENTS

| 2009/0003447 A1* | 1/2009 | Christoffersen et al. | 375/240.16 |
| 2009/0092086 A1* | 4/2009 | Lee et al. | 370/329 |
| 2009/0156194 A1* | 6/2009 | Meylan | 455/422.1 |
| 2014/0018073 A1* | 1/2014 | Frenger et al. | 455/434 |

OTHER PUBLICATIONS

Author Unknown, RACH Partitioning using Access Slots, pp. 1-2.*
Orfanos G et al: "An Adaptive MAC Protocol for MC-CDMA Adhoc Wireless Lan" Personal, Indoor and Mobile Radio Communications, 2005. PIMRC 2005. IE EE 16th International Symposium on Berlin, Germany Sep. 11-14, 2005, Piscataway, NJ, USA, IEEE, vol. 4, Sep. 11, 2005, XP010928188.

$3^{rd}$ Generation Partnership Project; Technical Specification Group Radio Access Network; User Equipment (UE) radio transmission and reception (FDD) (Release 7). 3GPP TS 25.101 v7.14.0 (Dec. 2008).

$3^{rd}$ Generation Partnership Project; Technical Specification Group Radio Access Network; Base Station (BS) radio transmission and reception (FDD) (Release 8). 3GPP TS 25.104 v8.5.0 (Dec. 2008).

$3^{rd}$ Generation Partnership Project; Technical Specification Group Radio Access Network; Evolved Universal Terrestrial Radio Access (E-UTRA); Base Station (BS) radio transmission and reception (Release 8). 3GPP TS 36.104 v8.4.0 (Dec. 2008).

* cited by examiner

METHOD AND ARRANGEMENT IN A WIRELESS COMMUNICATION SYSTEM

This application claims the benefit of U.S. Provisional Application No. 61/144,530, filed Jan. 14, 2009, the disclosure of which is incorporated herein by reference.

TECHNICAL FIELD

The present invention relates to a method and arrangement in a base station. In particular, it relates to a mechanism for resource allocation for additional spectrum emission avoidance.

BACKGROUND

3rd Generation Partnership Project (3GPP) work item on the Long Term Evolution (LTE) is sometimes also referred to as Evolved Universal Mobile Telecommunications System (UMTS) Terrestrial Radio Access Network (E-UTRAN). In E-UTRAN Orthogonal Frequency Division Multiple Access (OFDMA) technology is used in the downlink and Single Carrier Frequency Division Multiple Access (SC-FDMA) in the uplink.

In the present context, the expression uplink denotes the communication from a user equipment (UE) to a base station, while the expression downlink denotes communication in the opposite direction, i.e. from the base station to the user equipment.

In both uplink and downlink the data transmission is split into several sub-streams, where each sub-stream is modulated on a separate sub-carrier. Hence in OFDMA based systems, the available bandwidth is sub-divided into several resource blocks. A resource block is defined in both time and frequency. According to the current assumptions, a resource block size is 180 KHz and 0.5 ms in frequency and time domains, respectively. The transmission bandwidth in uplink and downlink can be as large as 20 MHz in E-UTRAN release 8. The ongoing enhancements in E-UTRAN would extend transmission bandwidths up to 100 MHz and 40 MHz in the downlink and uplink respectively.

E-UTRA system may be deployed over a wide range of bandwidths, e.g. 1.4, 3, 5, 10, 15, 20 MHz, etc. As an example a 10 MHz bandwidth would contain 50 resource blocks. For data transmission the network can allocate variable number of resource blocks to the user equipment, both in the uplink and downlink. This allows more flexible use of channel bandwidth since it is allocated according to the amount of data to be transmitted, radio conditions, user equipment capability, scheduling scheme etc.

Another important consideration is that even in the same eNodeB, or base station, multiple cells may comprise different bandwidths. In addition, different eNodeBs may have different bandwidths, e.g. 10 MHz cells in one set of eNodeB and 15 MHz cells in another set of NodeB. Thus, adjacent eNodeBs in the border areas may support cells with different bandwidths.

Out of band emission requirements: The user equipment as well as the base station have to fulfil certain number of Out Of Band (OOB) emission requirements. Some of these are set by regulatory bodies such as e.g. ITU-R, FCC, ARIB and ETSI. These out of band emission requirements are also referred to as regulatory radio requirements. The objective of out of band emission requirements is to limit the interference caused by the transmitter from user equipment and/or base station, outside its operating bandwidth to the adjacent carriers. Eventually the out of band emission requirements may be specified in 3GPP specifications.

The OOB requirements typically comprise of: Adjacent Channel Leakage Ratio (ACLR), Spectrum Emission Mask (SEM) and spurious emissions, whose specific definition can vary from one system to another. Furthermore, the OOB emission requirements have to be fulfilled on slot basis in Wideband Code Division Multiple Access (WCDMA), and sub-frame basis in E-UTRA.

Both user equipment and base station have to fulfil the OOB emission requirements irrespective of their transmission power level. In case of user equipment to conserve its battery power the efficiency of the power amplifier is very critical. Therefore an efficient power amplifier will be typically designed for certain typical operating points or configurations e.g. modulation type, number of active resource block, in case of E-UTRA, number of physical channel/channelization codes/spreading factor, in case of UTRA, which is based on Code Division Multiple Access (CDMA) technology. However, the user equipment may have to transmit using any combination of modulation, resource blocks etc. Therefore, in some uplink transmission scenarios the user equipment power amplifier may not be able to operate in the linear zone, thereby causing OOB band emissions due to harmonics or inter-modulation products. To ensure that user equipment fulfils OOB requirements for all allowed uplink transmission configurations the user equipment is allowed to reduce its maximum uplink transmission power in some scenarios when it reaches its maximum power. This is called maximum power reduction (MPR) or user equipment power back-off in some literature. For instance a user equipment with nominal maximum output/transmit power of 24 dBm power class may reduce its maximum power from 24 dBm to 23 or 22 dBm depending upon the configuration. The base station may also have to perform maximum power reduction but this is not standardized. Secondly the base station can afford to have a power amplifier with larger operating range since its efficiency is less critical compared to that of user equipment.

The maximum power reduction values for different configurations are generally well specified in the standard. The user equipment uses these values to apply maximum power reduction when the conditions for the corresponding configurations are fulfilled. These maximum power reduction values are regarded as static in a sense that they are independent of resource block allocation and other deployment aspects.

In UTRA the maximum power reduction requirements for the user equipment are specified in release 5 of the 3GPP specifications for some configurations that contain HS-DPCCH transmission. Similarly, maximum power reduction is also specified for configurations using Enhanced Dedicated Channel (E-DCH) for Quadrature Phase Sift Keying (QPSK) and 16 Quadrature Amplitude Modulation (QAM). In UTRA the maximum power reduction can be as large as up to 3 dB or even more. But the actual value depends upon a particular uplink transmission configuration such as e.g. codes, spreading factor, modulations, physical channels and their gain factors etc. Further evolution of UTRA, for instance to downlink and/or uplink multicarrier transmission, may require increased level of maximum power reduction. In Table 1 quoted below is illustrated how maximum power reduction requirements are currently defined for UTRA user equipment. Note that Cubic Metric (CM) is the measure of the power contained in the third order harmonic.

TABLE 1

| UE transmit channel configuration | CM (dB) | MPR (dB) |
|---|---|---|
| For all combinations of; DPDCH, DPCCH, HS-DPCCH, E-DPDCH and E-DPCCH | 0 ≤ CM ≤ 3.5 | MAX (CM-1, 0) |

Note 1:
CM = 1 for $\beta_c/\beta_d$ = 12/15, $\beta_{hs}/\beta_c$ = 24/15. For all other combinations of DPDCH, DPCCH, HS-DPCCH, E-DPDCH and E-DPCCH the MPR is based on the relative CM difference.

In E-UTRA the maximum power reduction requirements for the user equipment are also being specified. There the maximum power reduction will depend upon factors such as transmission bandwidth, modulation and number of allocated resource blocks. In Table 2 below is illustrated how maximum power reduction requirements are currently defined for E-UTRA user equipment. The illustrated user equipment power class 3 in E-UTRA corresponds to user equipment nominal maximum output power of 23 dBm without maximum power reduction.

TABLE 2

| | Channel bandwidth/Transmission bandwidth configuration (RB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

In E-UTRA an Additional Maximum Power Reduction (A-MPR) is also being specified on top of the normal maximum power reduction. The difference is that the former is not fully static. Instead it can vary between different cells, operating frequency bands and between cells belonging to different location areas. Additional spectrum emission requirement and additional maximum power reduction requirement are interchangeably used in literature.

The additional maximum power reduction includes all the remaining power reduction, on top of the normal maximum power reduction needed to account for factors such as: bandwidth, frequency band, resource block allocation to satisfy additional such as requirements set by regional regulatory bodies (FCC, ARIB etc). In Table 3 below is illustrated how additional maximum power reduction requirements are currently defined for E-UTRA user equipment in 3GPP TS 36.101: Evolved Universal Terrestrial Radio Access (E-UTRA); User Equipment (UE) radio transmission and reception

TABLE 3

| Network Signalling value | Requirements (sub-clause) | E-UTRA Band | Channel bandwidth (MHz) | Resources Blocks | A-MPR (dB) |
|---|---|---|---|---|---|
| NS_01 | NA | NA | NA | NA | NA |
| NS_03 | 6.6.2.2.1 | 2, 4, 10, 35, 36 | 3 | >5 | ≤1 |
| | 6.6.2.2.1 | 2, 4, 10, 35, 36 | 5 | >6 | ≤1 |
| | 6.6.2.2.1 | 2, 4, 10, 35, 36 | 10 | >6 | ≤1 |
| | 6.6.2.2.1 | 2, 4, 10, 35, 36 | 15 | >8 | ≤1 |
| | 6.6.2.2.1 | 2, 4, 10, 35, 36 | 20 | >10 | ≤1 |
| NS_04 | 6.6.2.2.2 | TBD | TBD | TBD | |
| NS_05 | 6.6.3.3.1 | 1 | 10, 15, 20 | ≥50 for QPSK | ≤1 |
| NS_06 | 6.6.2.2.3 | 12, 13, 14, 17 | 1.4, 3, 5, 10 | n/a | n/a |
| NS_07 | 6.6.2.2.3 6.6.3.3.2 | 13 | 10 | Table 6.2.4-2 | Table 6.2.4-2 |
| ... | | | | | |
| NS_32 | — | — | — | — | — |

It is important to consider band 13 with respect to additional maximum power reduction requirements. Band 13 is one of the E-UTRAN FDD bands in the range of 700 MHz exclusively allocated in the USA. More specifically it operates for the uplink in the band from 777 MHz to 787 MHz and for the downlink in the band from 746 MHz to 756 MHz and entirely owned by one network operator.

One peculiar aspect of this band is its proximity to the Public Safety (PS) band. The public safety band is located on the left the of uplink part of band 13. According to FCC regulation the operation adjacent to the public safety band requires very tight emission requirements. This means the additional maximum power reduction requirements for band 13 are much tighter than those for the other bands. The E-UTRAN Physical Uplink Control Channels (PUCCH) are located at the edge of the bandwidth. Therefore the outer resource blocks of the bandwidth of cell operating in band 13 are required to maintain even tighter requirements, i.e. larger additional maximum power reduction requirements, compared to those located in the centre of the bandwidth.

Due to this reason the additional maximum power reduction requirements for band 13 are agreed to be split into 3 regions comprising of different set of contiguous resource blocks. The Table 4 below containing the split of bandwidth in 3 regions is reproduced. The Table 4 illustrates that the uplink cell bandwidth may be divided into 3 regions as described above. Each region is likely to have different additional maximum power reduction requirements.

RB start indicates the lowest resource block index of transmitted resource blocks and L_CRB is the length of a contiguous resource block allocation.

The Table 4 below is one proposal to attempt to specify the additional maximum power reduction figures. As can be seen from the Table 4, the additional maximum power reduction in 3GPP for band 13 in 3GPP TS 36.101: Evolved Universal Terrestrial Radio Access (E-UTRA); User Equipment (UE) radio transmission and reception can be very large, i.e. 6-14 dB. Furthermore the additional maximum power reduction value is dependent upon the part of the cell bandwidth. Hence prudent uplink resource allocation is required to avoid unnecessary additional maximum power reduction.

TABLE 4

|  | | Region A | Region B | | Region C |
|---|---|---|---|---|---|
| RB_start[1] | | 0-12 | 13-18 | 19-42 | 43-49 |
| L_CRB[2] [RBs] | 6-8 | 1 to 5 and 9-50 | ≥8 | ≥18 | ≤2 |
| A-MPR [dB] | 8 | 12 | 12 | 6 | 3 |

Note
[1]RB_start indicates the lowest RB index of transmitted resource blocks
[2]L_CRB is the length of a contiguous resource block allocation
[3]For intra-subframe frequency hopping between two regions, notes 1 and 2 apply on a per slot basis.
[4]For intra-subframe frequency hopping between two regions, the larger A-MPR value of the two regions may be applied for both slots in the subframe.

Due to variable bandwidth, varying number of resource block allocation, different bands in different parts of the networks etc, that the additional maximum power reduction need to fulfil, the regulatory requirements can vary from one eNodeB to another. Even if the deployment scenario, in terms of bands used, bandwidth size etc, is homogeneous in a large coverage area, there will always be border regions between these coverage areas. Indeed additional maximum power reduction is a cell specific value. Therefore, additional maximum power reduction is signalled to the user equipment via system information and via an user equipment specific channel. This will allow the user equipment to acquire this information when it camps on to a cell. The values will be used when it starts transmitting in the uplink.

In E-UTRAN system handover access takes place via Physical Random Access Channel (PRACH). The PRACH resources, i.e. resource blocks and sub-frames used for PRACH transmission are signalled to the user equipment via broadcast and/or user equipment specific channel.

The resource assignment for uplink and downlink transmission is done by the network in UTRAN and E-UTRAN. It is up to the network to use one or more available measurements for allocating the resources. For instance for generating the uplink scheduling grant or uplink resource allocation, the network can use one or more of the following state of the art reports: user equipment transmit power, user equipment power headroom, i.e. the difference between user equipment max power and user equipment estimated/measured power, user equipment buffer size, Happy bit, path loss and/or signal strength.

One or more of these measurements enable the network to decide the amount of resources the user equipment needs for uplink transmission.

Drawbacks of prior art solutions regarding maximum power reduction and/or additional maximum power reduction comprise inter alia:

The resource allocation node does not take into account the impact of maximum power reduction and/or additional maximum power reduction when issuing uplink grant or resource assignment. The desired uplink grant may not be fully used by user equipment in power limiting situation due to applied maximum power reduction and/or additional maximum power reduction. This will lead to the wastage of grant, which could otherwise be allocated to another prospective user equipment. Another implication is that the coverage loss may occur due to maximum power reduction and/or additional maximum power reduction depending upon the uplink grant.

The additional maximum power reduction can be as large as 15 dB in some portion of the bandwidth in certain bands e.g. band 13. Hence LTE user equipment of power class 23 dBm would transmit at maximum 8 dBm of output power. This means if resources are allocated without any regard to the expected maximum power reduction and/or additional maximum power reduction then there will be severe consequence of coverage less.

In case of PRACH transmission which is also used for the handover access if the resources, i.e. resource blocks in LTE are allocated in the part of bandwidth with larger maximum power reduction and/or additional maximum power reduction then there is high risk of call blocking, i.e. poor initial access, and call dropping, i.e. poor handover access. In LTE different PRACH formats are defined: formats 0, 1, 2, 3 and 4. This can be even more critical for format #4 since it is very short in time.

SUMMARY

It is therefore an object of the present invention to obviate at least some of the above stated disadvantages and provide a mechanism for improving the performance in a wireless communication system.

According to a first aspect of the present invention, the objective is achieved by a method in a base station. The method aims at scheduling physical resources in a transmission bandwidth to a user equipment, served by the base station. The physical resources may comprise physical channels or radio resource blocks. Some physical resources within the transmission bandwidth are subjected to a performance requirement power restriction value. The method comprises scheduling physical resources, based on the performance requirement power restriction value of the physical resources to be scheduled.

According to a second aspect of the present invention, the objective is achieved by an arrangement in a base station for scheduling physical resources in a transmission bandwidth to a user equipment, served by the base station. The physical resources may comprise physical channels or radio resource blocks. Some physical resources within the transmission bandwidth are subjected to a performance requirement power restriction value. The arrangement comprises a scheduling unit. The scheduling unit is adapted to schedule physical resources, based on the performance requirement power restriction value of the physical resources to be scheduled.

According to a third aspect of the present invention, the objective is achieved by a method in a user equipment. The method aims at assisting a base station in scheduling physical resources in a transmission bandwidth to the user equipment. The physical resources may comprise physical channels or radio resource blocks. Some physical resources within the transmission bandwidth are subjected to a performance requirement power restriction value. The method comprises receiving a path loss threshold value from the base station, estimating the path loss of signals to be sent to the base station, comparing the estimated path loss with the received path loss threshold value, and selecting physical resources for scheduling based on the comparison between the estimated path loss and the signalled path loss threshold value.

According to a fourth aspect of the present invention, the objective is achieved by an arrangement in a user equipment for assisting a base station in scheduling physical resources in a transmission bandwidth to the user equipment. The physical resources may comprise physical channels or radio resource blocks. Some physical resources within the transmission bandwidth are subjected to a performance requirement power restriction value. The user equipment arrangement comprises a receiver. The receiver is adapted to receive a path loss threshold value from the base station. Further, the arrangement comprises an estimation unit. The estimation unit is adapted to estimate the path loss of signals to be sent to the base station. Also, additionally, the arrangement comprises a comparison unit. The comparison unit is adapted to compare the estimated path loss with the received path loss threshold value. Still further, the arrangement comprises a selector unit. The selector unit is adapted to select physical resources for scheduling based on the comparison between the estimated path loss and the signalled path loss threshold value.

Thanks to the present solution, as resources such as e.g. MCS, power, codes/resource blocks are used more efficiently, it possible to improve resource utilization in the cell. Further, coverage loss due to maximum power reduction/added maximum power reduction is avoided or at least somewhat reduced. In addition, an uplink grant may be fully utilized; it is not wasted by the scheduled user equipment in a power limiting situation. According to the present method, a more aggressive grant may be issued to user equipments not requiring maximum power reduction/added maximum power reduction. Also, in further addition, improved PRACH reception performance may lead to better grade of service: lower call blocking and cell dropping, e.g. in LTE. The method for network controlled output power of the user equipment on dedicated basis may be performed in order to avoid excessive out of band emission by a particular user equipment, or a particular group of user equipments. Thus the performance of the wireless communication system is improved.

Other objectives, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement in a base station, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1:
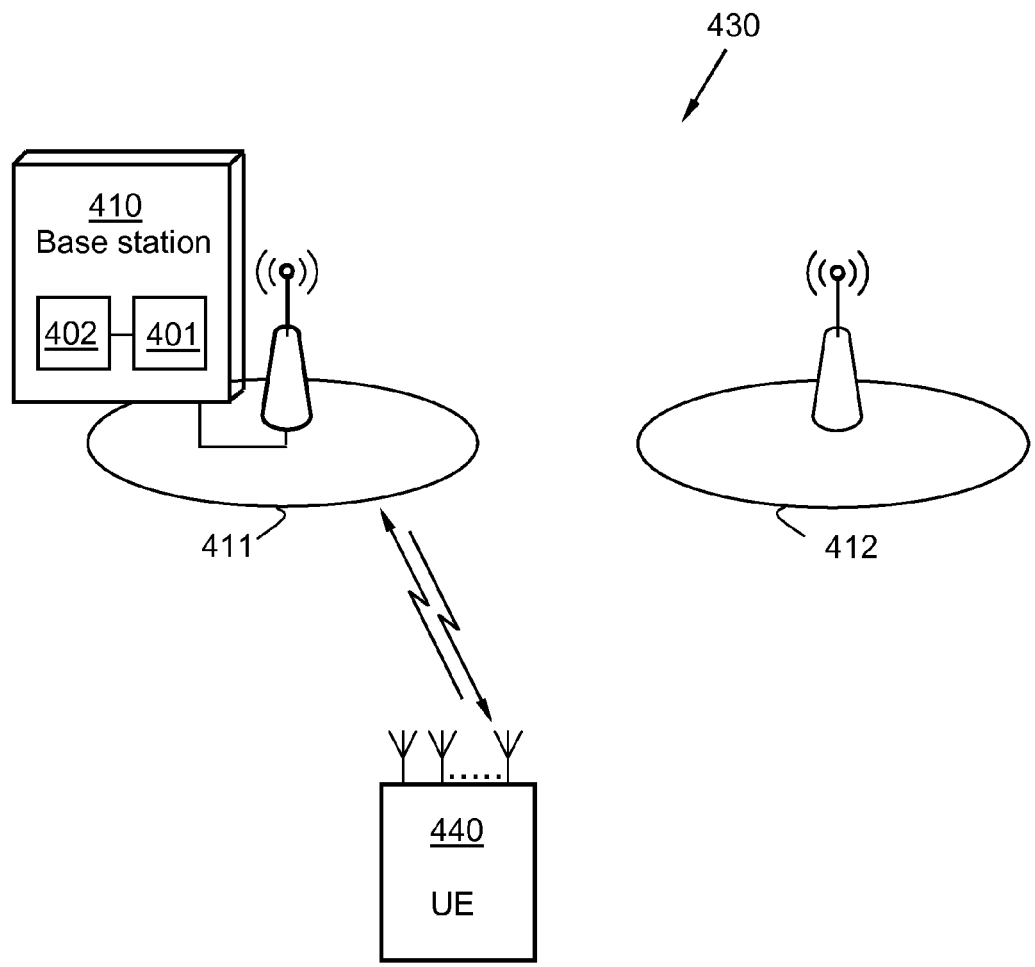
FIG. 1 is a schematic block diagram illustrating an exemplary wireless communication system, in which the present method and arrangement may be applicable.

FIG. 1 depicts a wireless communication system 430, such as e.g. the E-UTRAN, LTE, LTE-Adv, Global System for Mobile communications/Enhanced Data rate for GSM Evolution (GSM/EDGE), Wideband Code Division Multiple Access (WCDMA), a 3GPP WCDMA system, Worldwide Interoperability for Microwave Access (WiMax), or Ultra Mobile Broadband (UMB), just to mention some few arbitrary possible options.

The wireless communication system 430 comprises a user equipment 440 and its serving cell 411 with base station 410 and one exemplary neighbour cell 412. The user equipment 440 is adapted to communicate with the base station 410. The base station 410 may comprise a means 402 for allocation of resources as described above and corresponding processing means 401, according to some embodiments. The purpose of the illustration in FIG. 1 is to provide a general overview of the present methods and the functionalities involved.

In the following, the present methods and arrangements are further elaborated with specific reference to LTE systems such as e.g. E-UTRAN. Thus the wireless communication system 430 is described and exemplified mainly as an E-UTRAN network throughout the rest of the description, for enhanced comprehension and readability. However, it is obvious to a skilled person that corresponding concepts could also be applied in other wireless communication systems 430.

The base station 410 may be referred to as e.g. a NodeB, an evolved Node B (eNB, or eNode B), a base transceiver station, Access Point Base Station, base station router, or any other network unit capable to communicate with the user equipment 440 within the cell, depending e.g. of the radio access technology and terminology used. In the rest of the description, the term "base station" will be used for the base station 410, in order to facilitate the comprehension of the present methods and arrangements.

The user equipment 440 may be represented by e.g. a wireless communication terminal, a mobile cellular phone, a Personal Digital Assistant (PDA), a wireless platform, a laptop, a computer or any other kind of device capable to communicate wirelessly with the base station 410.

The base station 410 controls the radio resource management within the cell 411. Also, the base station 410 is responsible for ensuring reliable communication links between the base station 410 and the user equipment 440 e.g. by means of outer Automatic Repeat reQuest (ARQ).

A basic concept of the present methods and arrangements is to allocate resources, i.e. resource blocks to user equipment for transmissions to reduce, minimize or avoid the out of band emission by taking into consideration the emission requirements such as the additional spectrum emission requirements or additional maximum power reduction.

Figure 2:
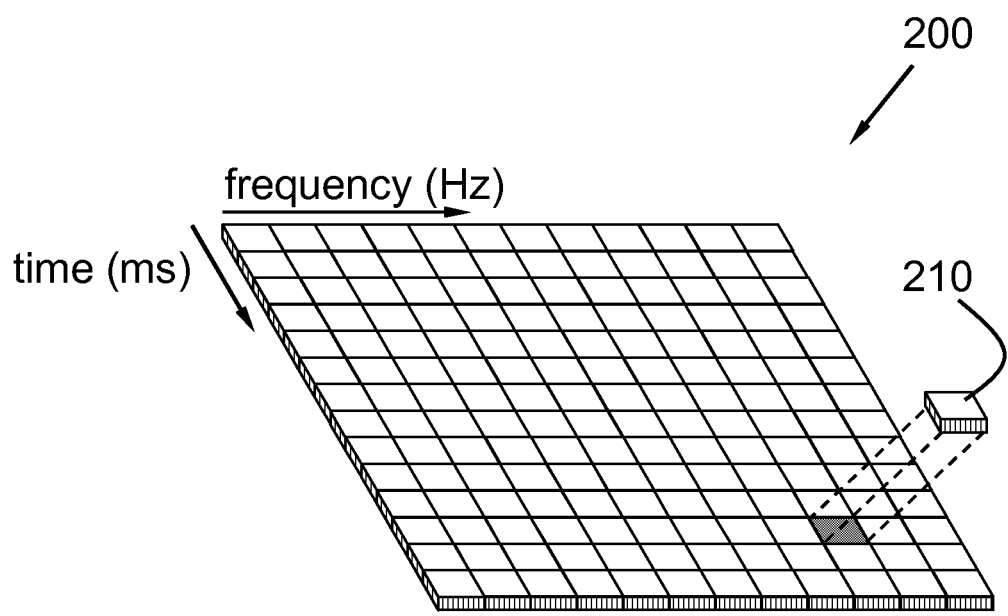
FIG. 2 is a schematic block diagram illustrating a resource block.

FIG. 2 illustrates an LTE resource block 200, assuming a single transmit antenna, which may be used by the user equipment 440 and the base station 410 when communicating, according to some embodiments.

A physical resource block 200 in the present context may be defined as a number of consecutive symbols in the time domain and a number of consecutive sub carriers in the frequency domain, as illustrated in FIG. 2. A physical resource block 200 in the uplink or downlink, thus may comprise resource elements 210, corresponding to one slot in the time domain, sometimes referred to as a Transmission Time Interval (TTI) and e.g. 180 kHz in the frequency domain. When several resource blocks 200 are assigned to one user equipment 440, the resource block 200 may be consecutive in the frequency domain.

Figure 3:
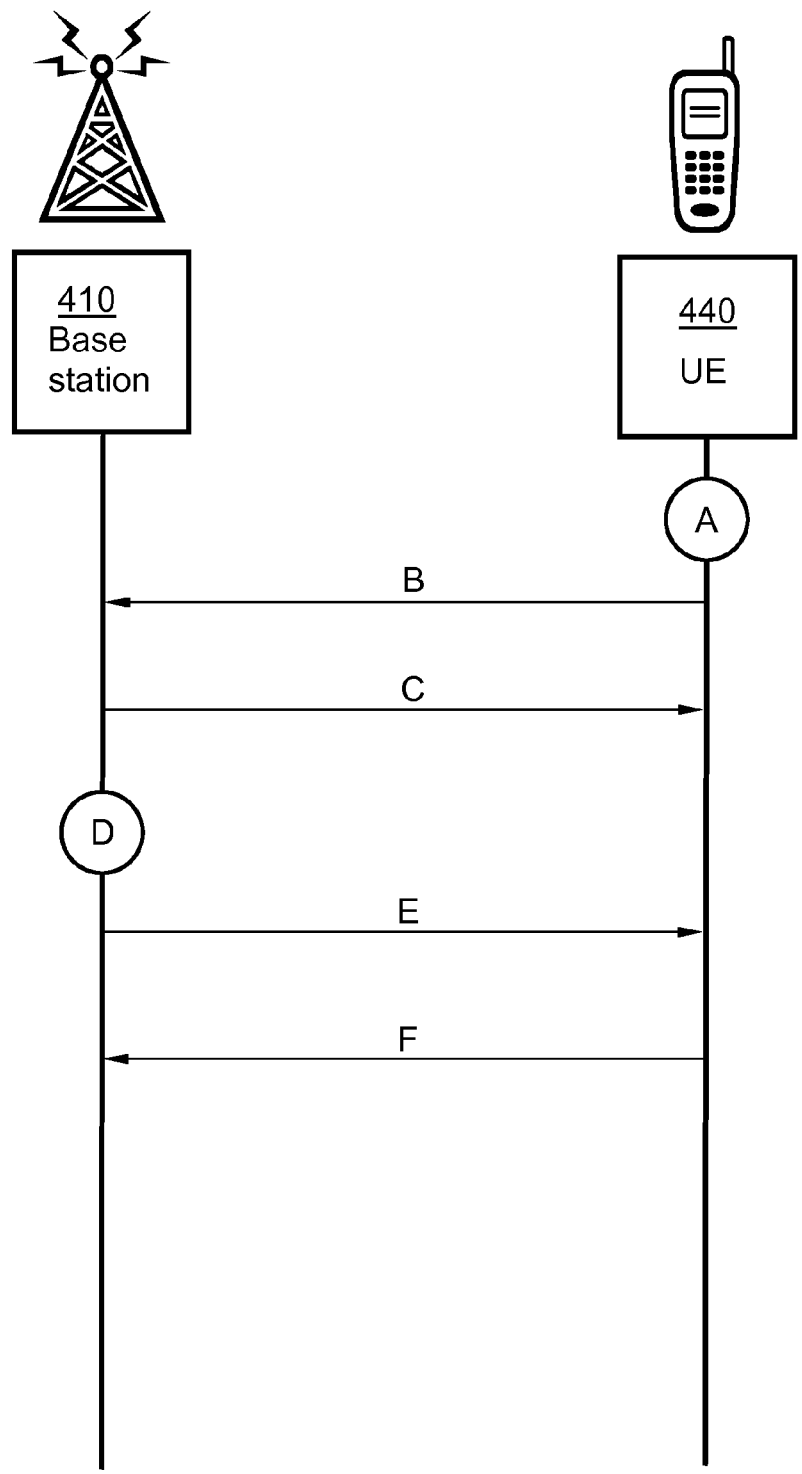
FIG. 3 is a combined block diagram and signalling scheme, illustrating some method steps and signalling comprised in some embodiments of the present method.

FIG. 3 is a combined block diagram and signalling scheme, illustrating some method steps and signalling denoted from A to F, comprised in some embodiments of the present method.

The method according to the present invention will now be described in a number of method steps A-F performed by embodiments in base station and user equipment, respectively. It is to be noted that the method steps A-F may be performed in another sequential order than the enumeration indicates. Also, some of the method steps according to the described embodiments are optional and only comprised within some embodiments.

Step A

The user equipment 440, which may have data in the data buffer to transmit, performs a measurement. The measurement may comprise e.g. the user equipment transmit power, user equipment power headroom being the difference between the maximum output power and the transmitted power in logarithmic scale of the user equipment 440, buffer size, happy bit indicating whether the user equipment 440 is satisfied with current grant/physical resources or not, path loss and/or signal strength, just to mention some examples.

Step B

The measured value or values may be sent to the base station 410.

Step C

A path loss threshold value may according to some optional embodiments be signalled to the user equipment 440. The optional path loss threshold value may be used by the user equipment 440 to make an approximation whether the user equipment 440, e.g. when sending PRACH, is to be prioritized or not. If an estimated path loss value of the user equipment 440 exceeds the signalled path loss threshold value, the user equipment 440 may be considered prioritized, otherwise it may be considered non prioritized, according to different embodiments.

Step D

A scheduling of physical resources 200 to the user equipment 440 may be performed based on the performance requirement power restriction value of the physical resources 200 to be scheduled.

The following considers by means of example two cases of resource allocation with several embodiments that ensure that a user equipment 440 transmits with relatively lower maximum power reduction and/or additional maximum power reduction:

a) resource allocation for PRACH, and
b) resource allocation for data transmission.

For a) resource allocation for PRACH, the following embodiments: PRACH resource allocation is the same for all transmissions (a1), PRACH resource allocation for hand over (a2) and Threshold based PRACH resource allocation (a3) may be considered.

PRACH Resource Allocation is the Same for all Transmissions (a1)

In this embodiment the base station 410 may allocate PRACH resources 200 such as e.g. resource block or frequency resource for PRACH in the part of the uplink cell bandwidth that would lead to the lowest level or relatively lower level of one or more of the following performance requirements: user equipment maximum power reduction, user equipment additional maximum power reduction or additional spectrum emissions.

The rationale of this embodiment stems from the fact that typically the base station 410 does not know the path loss of user equipment 440 transmitting PRACH. A user equipment 440 far out in the cell 411 needs to transmit with higher transmit power. This in case of larger maximum power reduction and/or additional maximum power reduction is required the PRACH transmission from such a user equipment 440 may not get through.

This approach may increase a higher probability for the correct reception of PRACH in the uplink, according to some embodiments. This is because the user equipment 440 according to this embodiment can transmit PRACH signalling with relatively higher power since the applied additional maximum power reduction is relatively lower.

The same solution but applying the same allocation, e.g., in part with lowest additional maximum power reduction may be used for all type of PRACH transmissions: initial access, transmission after inactivity, for handover access etc. This embodiment can be an implementation algorithm in the base station 410.

PRACH Resource Allocation for Hand Over (a2)

In this embodiment the base station 410 may allocate PRACH resources 200, such as e.g. resource block or frequency resource for PRACH, only for handover access in the part of the uplink cell bandwidth that would lead to the lowest level or relatively lower level of one of more of the following performance requirements: user equipment maximum power reduction, user equipment additional maximum power reduction or additional spectrum emissions. Since handover access typically occurs at the cell border where the user equipment 440 operates at higher transmit power, this solution can reduce handover access failures due to user equipment transmit power limitation.

Threshold Based PRACH Resource Allocation (a3)

In this embodiment the network allocated more than one PRACH resources. For instance one PRACH resource (R1) is in the part of the uplink cell bandwidth leading to the lowest level, or relatively lower level, of one or more of the following performance requirements: user equipment maximum power reduction, user equipment additional maximum power reduction or additional spectrum emissions. The other PRACH resource (R2) can be allocated in the part of uplink cell bandwidth regardless of the impact user equipment maximum power reduction or additional maximum power reduction or additional spectrum emissions.

In addition the base station 410 may signal a path loss threshold value to the user equipment 440 via e.g. a broadcast channel or via a user equipment specific channel. The user equipment 440 prior to PRACH transmission may estimate the path loss to estimates the uplink transmission power. The user equipment 440 can thus compare the estimated path loss with the signalled path loss threshold value to decide which PRACH resource to be used for the random access. If the estimated path loss is larger than the signalled path loss threshold value, then user equipment 440 may use resource R1 otherwise it may use resource R2. This will ensure that the PRACH transmission takes place with lower additional maximum power reduction when a user equipment has poor radio conditions i.e. larger path loss, leading to higher probability of its reception at the base station 410.

b) Resource Allocation for Data Transmission

In this embodiment the base station 410 may allocate the resources 200 to user equipment 440 for data transmission, such as e.g. user data or higher layer signalling etc while taking into consideration one or more of the following performance requirements: user equipment maximum power reduction, user equipment additional maximum power reduction or additional spectrum emission.

Three different cases may be considered: Adaptation of resource allocation size (b1), Adaptation of resource allocation position (b2) and Adaptation of resource allocation size and position (b3).

Adaptation of Resource Allocation Size (b1)

In this embodiment the base station 410 may take into account the impact of the resources e.g. number of resource blocks intended to be assigned to the user equipment 440 on the user equipment emission requirements such as i.e. maximum power reduction and/or additional maximum power reduction. The base station 410 may assign the resources 200, which user equipment 440 can successfully transmit or adequately transmit after applying the maximum power reduction and/or additional maximum power reduction. In this way the assigned resources will not be handled.

The amount or the number of resources to be assigned for uplink transmission are adjusted or adapted by the base station 410. For instance, the number of resource blocks 200 and the modulation type can be adapted in E-UTRAN. In UTRAN the number of channelization codes or the modulation type can be adapted.

The base station 410 may use one or more of the user equipment reported measurements, e.g. user equipment transmit power, user equipment power headroom, and the maximum power reduction and/or additional maximum power reduction requirements to adapt the assigned resources. When user equipment transmit power is above the threshold uplink scheduler in the base station 410 may issue/adjust uplink grant that avoids or minimizes maximum power reduction and/or additional maximum power reduction.

Adaptation of Resource Allocation Position (b2)

In this embodiment the base station 410 may take into account the impact of the position of the resources 200 e.g. resource block position or index in the cell bandwidth, intended to be assigned to the user equipment 440 on the user equipment emission requirements, i.e. maximum power reduction and/or additional maximum power reduction.

The base station 410 also may use one or more of the user equipment reported measurements, such as e.g. user equipment transmit power, user equipment power headroom, buffer size etc, and the maximum power reduction and/or additional maximum power reduction requirements to adapt the assigned resources i.e. position of resource blocks 200.

The base station 410 assigns the resources to the user equipment 440 in the part of the uplink cell bandwidth that would lead to the lowest level or relatively lower level of maximum power reduction and/or additional maximum power reduction. For instance in frequency band 13 the base station 410 may assign resources 200 in the centre of the cell bandwidth (region B).

As this cannot be done for all user equipment 440, the base station 410 can select the user equipment 440, e.g., based on one or more of the following criteria: user equipment requiring larger grant e.g. as indicated by buffer size reports from the user equipment 440, and/or user equipment 400 with larger path loss e.g. as indicated by user equipment transmit power or power headroom reports.

This embodiment is specific to OFDMA based system 430 such as E-UTRAN where the bandwidth is divided into sub-bands or resource blocks 200.

Adaptation of Resource Allocation Size and Position (b3)

This embodiment is the combination of previously presented two embodiments b1 and b2. Thus the base station 410 may take into consideration one or more measurements or reports, such as e.g. buffer size, happy bit, user equipment transmit power, user equipment power headroom etc, to determine how much maximum power reduction and/or additional maximum power reduction is required for a particular assignment. The base station 410 may adapt to size of the grant and the position of the grant that would lead to the best utilization of assigned resources 200 as well as least possible maximum power reduction and/or additional maximum power reduction. This embodiment is also specific to OFDMA based system 430 such as E-UTRAN where the bandwidth is divided into sub-bands or resource blocks 200.

Step E

A message, e.g. a grant may be transmitted to the user equipment 440, comprising information concerning the allocated resources 200, scheduled for the user equipment 440.

Step F

The user equipment 440 may utilize the granted resources 200 for data transmission or PRACH, respectively.

Thereby is it possible to improve resource utilization in the cell, as resources 200 such as e.g. MCS, power, codes/resource blocks 200 are used more efficiently. Further, coverage loss due to maximum power reduction/added maximum power reduction is avoided or at least somewhat reduced. In addition, an uplink grant may be fully utilized; it is not wasted by the scheduled user equipment 440 in a power limiting situation. According to the present method, a more aggressive grant may be issued to user equipments 440 not requiring maximum power reduction/added maximum power reduction. Also, in further addition, improved PRACH reception performance may lead to better grade of service: lower call blocking and cell dropping, e.g. in LTE. The method for network controlled output power of the user equipment 440 on dedicated basis may be performed in order to avoid excessive out of band emission by a particular user equipment 440, or a particular group of user equipments 440.

Figure 4:
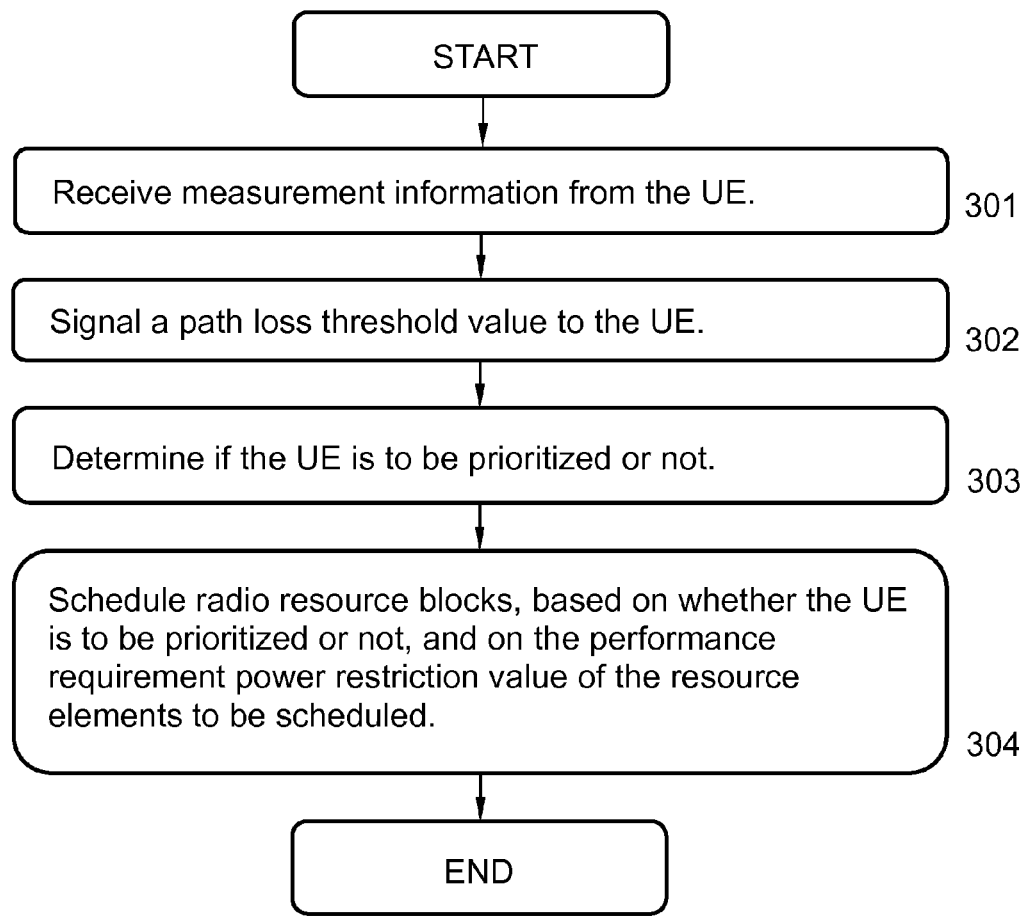
FIG. 4 is a flow chart illustrating embodiments of the present method in a base station.

FIG. 4 is a flow chart illustrating embodiments of method steps 301-304 performed in a base station 410. The method steps 301-304 aims at scheduling physical resources 200 in a transmission bandwidth, to a user equipment 440 served by the base station 410. The physical resources 200 to schedule may be e.g. physical channels or radio resource blocks 200. Some physical resources 200 within the transmission bandwidth are subjected to a performance requirement power restriction value. The performance requirement power restriction value may be e.g. a maximum power reduction value, an additional maximum power reduction value, the sum of the maximum power reduction value added to the additional maximum power reduction value, a power back off or additional spectrum emissions.

The user equipment 440 and the base station 410 may be comprised in a wireless communication system 430, which may be e.g. a LTE radio network and the base station 410 may be e.g. an evolved node B, eNB, according to some embodiments. The physical resources 200 to be scheduled may according to some embodiments comprise resource blocks in an OFDMA system 430 such as E-UTRAN. However, according to some embodiments the physical resources 200 to be scheduled may comprise CDMA channelization code in a CDMA system 430 such as WCDMA or CDMA2000. However, the physical resources 200 may, according to some embodiments comprise resource blocks 200 within a frequency band, which are subjected to a performance requirement power restriction value larger than a power restriction threshold limit value. Some resource blocks 200 may be subjected to a performance requirement power restriction value less than the power restriction threshold limit value. The physical resources 200 to be scheduled may however comprise Physical Random Access Channel (PRACH) resources, according to some embodiments.

To appropriately schedule physical resources 200 to the user equipment 440, the method may comprise a number of method steps 301-304.

It is however to be noted that some of the described method steps are optional and only comprised within some embodiments. Further, it is to be noted that the method steps 301-304 may be performed in a somewhat different chronological order and that some of them, e.g. step 303 and step 304, may be performed simultaneously or in a rearranged chronological order. The method may comprise the following steps:

Step 301

This step is optional and may only be performed within some embodiments.

Measurement information may be received from the user equipment 440, according to some embodiments.

The measurement information received from the user equipment 440 may comprise one or more of the following measurements or reports: user equipment transmit power, user equipment power headroom being the difference between the maximum output power and the transmitted power in logarithmic scale of the user equipment 440, buffer size, happy bit indicating whether the user equipment 440 is satisfied with current grant/physical resources or not, path loss and/or signal strength.

Step 302

This step is optional and may only be performed within some embodiments.

A path loss threshold value may optionally be signalled to the user equipment 440.

Step 303

This step is optional and may only be performed within some embodiments.

It may be determined if the user equipment 440 is to be prioritized or not.

The user equipment 440 may according to some embodiments be determined to be prioritized if the estimated path loss of the user equipment 440 exceeds the signalled path loss threshold value.

The step of determining if the user equipment 440 is to be prioritized or not may comprise estimating an actual transmit power of the user equipment 440, by computing the transmit power, based on the received measurement information and subtracting the performance requirement power restriction value of the resources to be scheduled to the user equipment 440. Further, only user equipment 440 with a computed actual transmit power bigger than an actual transmit power threshold value may be considered to be prioritized, according to some embodiments.

In order to determine if a user equipment 440 is to be prioritized or not, decision may be based on one or more of the following criteria: user equipment 440 requiring a grant larger than a grant size threshold value e.g. as indicated by buffer size reports from the user equipment 440, and/or user equipment 440 with a path loss exceeding the path loss threshold value, e.g. as indicated by the transmit power report or the power headroom report being the difference between the maximum output power and the transmitted power in logarithmic scale of the user equipment 440, and/or user equipment 440 requesting a service with a data rate exceeding a data rate threshold value, according to some embodiments.

According to some embodiments, the user equipment 440 may be prioritized if PRACH resources are requested. Optionally, the user equipment 440 may be prioritized if a handover access is to be scheduled.

Step 304

Physical resources 200 are scheduled, based on the performance requirement power restriction value of the physical resources 200 to be scheduled.

The scheduling of physical resources 200 may further be based on whether the user equipment 440 is to be prioritized or not, according to some embodiments.

The scheduling of physical resources 200, e.g. resource blocks 200, may optionally further comprise scheduling of resource blocks 200 that are subjected to a maximum power decrease less than the power restriction threshold limit value, if the user equipment 440 is determined to be prioritized and scheduling resource blocks 200 that are subjected to a maximum power decrease exceeding the power restriction threshold limit value, if the user equipment 440 is not determined to be prioritized.

The step of scheduling 304 radio resource blocks 200 may optionally comprise, according to some embodiments, only scheduling resource blocks 200 to user equipment 440 estimated to have an actual transmit power exceeding the performance requirement power restriction value of that resource block 200, according to some embodiments.

Figure 5:
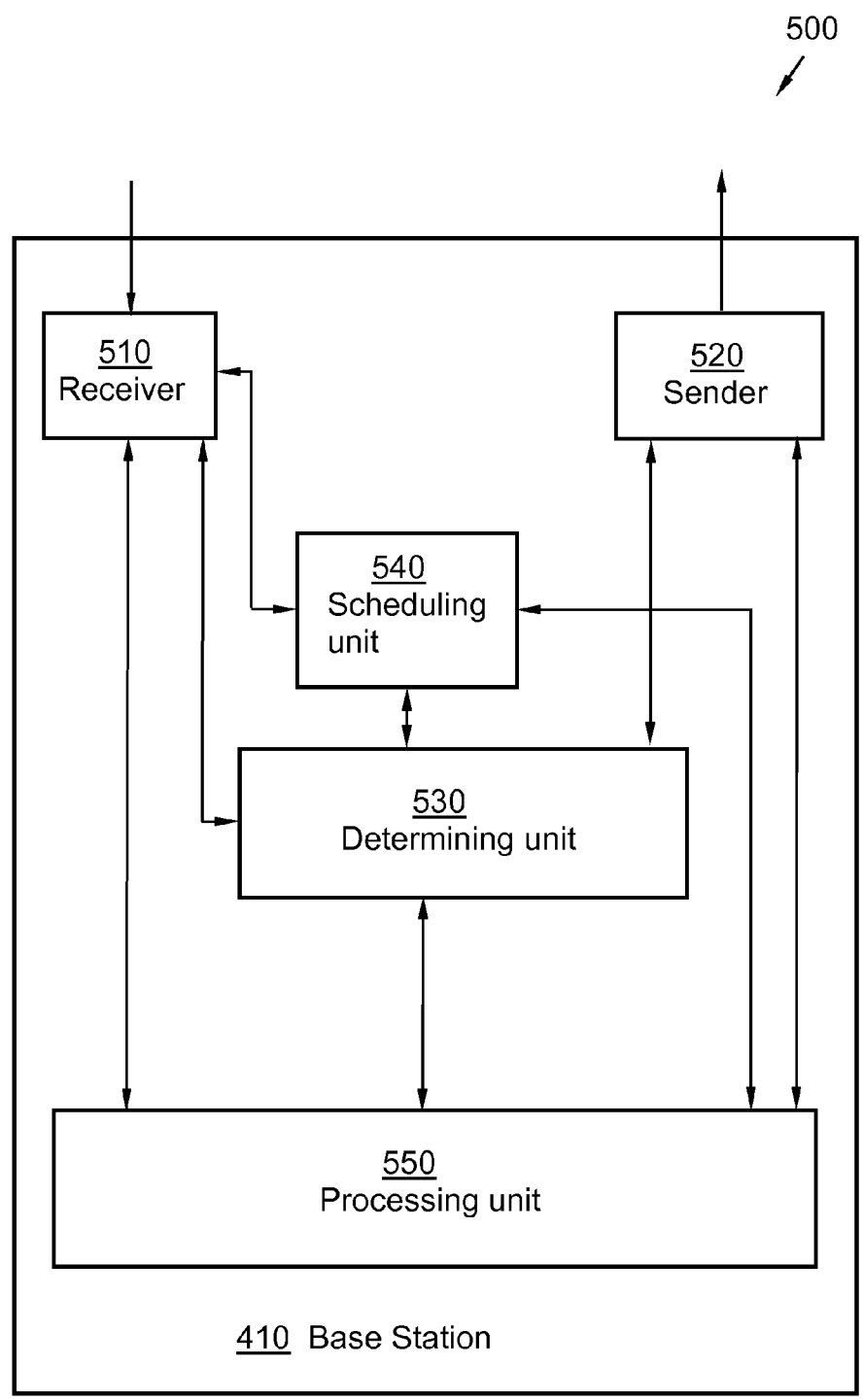
FIG. 5 is a schematic block diagram illustrating embodiments of a base station arrangement.

FIG. 5 schematically illustrates an arrangement 500 in a base station 410. The arrangement 500 is adapted to perform any, some or all of the method steps 301-304 in order to schedule physical resources 200 to a user equipment 440 served by the base station 410. The physical resources 200 to schedule may be e.g. physical channels or radio resource blocks 200. Some physical resources 200 within the transmission bandwidth are subjected to a performance requirement power restriction value. The performance requirement power restriction value may be e.g. a maximum power reduction value, an additional maximum power reduction value, the sum of the maximum power reduction value added to the additional maximum power reduction value, a power back off or additional spectrum emissions.

The user equipment 440 and the base station 410 may be comprised in a wireless communication system 430, which may be e.g. a LTE radio network and the base station 410 may be e.g. an evolved node B, eNB, according to some embodiments. The physical resources 200 to be scheduled may according to some embodiments comprise resource blocks in an OFDMA system 430 such as E-UTRAN. However, according to some embodiments the physical resources 200 to be scheduled may comprise CDMA channelization code in a CDMA system 430 such as WCDMA or CDMA2000. However, the physical resources 200 may, according to some embodiments comprise resource blocks 200 within a frequency band, which are subjected to a performance requirement power restriction value larger than a power restriction threshold limit value. Some resource blocks 200 may be subjected to a performance requirement power restriction value less than the power restriction threshold limit value. The physical resources 200 to be scheduled may however comprise Physical Random Access Channel (PRACH) resources, according to some embodiments.

In order to perform the method steps 301-304 correctly, the base station arrangement 500 comprises a plurality of units such as e.g. a scheduling unit 540. The scheduling unit 540 is adapted to schedule physical resources 200 based on the performance requirement power restriction value of the physical resources 200 to be scheduled.

According to some embodiments, the arrangement 500 in addition may comprise a receiver 510. The receiver 510 may be adapted to receive radio signals from other units such as e.g. the user equipment 440.

Further, the base station arrangement 500 may optionally comprise a sender 520. The sender 520 may be adapted to send a radio signal to be received by the user equipment 440.

Also, additionally, the arrangement 500 may comprise a determining unit 530. The determining unit 530 may be configured for determining if the user equipment 440 is to be prioritized or not, according to some embodiments.

Optionally, the arrangement 500 further also may comprise a processing unit 550. The processing unit 550 may be represented by e.g. a Central Processing Unit (CPU), a processor, a microprocessor, or other processing logic that may interpret and execute instructions. The processing unit 550 may perform all data processing functions for inputting, outputting, and processing of data including data buffering and device control functions, such as call processing control, user interface control, or the like.

It is to be noted that any internal electronics of the base station 410 and/or the base station arrangement 500, not completely necessary for understanding the present method according to the method steps 301-304 has been omitted from FIG. 5, for clarity reasons.

Further, it is to be noted that some of the described units 510-550 comprised within the arrangement 500 in the base station 410 are to be regarded as separate logical entities but not with necessity separate physical entities. To mention just one example, the receiver 510 and the sender 520 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 410 and the user equipment 440 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 301-304 in the base station 410 may further be implemented through one or more processor units 550 in the base station 410, together with computer program code for performing the functions of the present method steps 301-304. Thus a computer program product, comprising instructions for performing the method steps 301-304 in the base station 410 may schedule physical resources 200 to the user equipment 440 served by the base station 410, when the computer program product is loaded into the processor unit 550.

The computer program product mentioned above may be provided for instance in the form of a data carrier carrying computer program code for performing the method steps according to the present solution when being loaded into the processor unit 550. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 410 remotely, e.g. over an Internet or an intranet connection.

Further, a computer program product comprising instructions for performing at least some of the method steps 301-304 may be used for implementing the previously described method in the base station 410 for scheduling physical resources 200 to the user equipment 440 served by the base station 410, when the computer program product is run on the processing unit 550 comprised within the base station 410.

Figure 6:
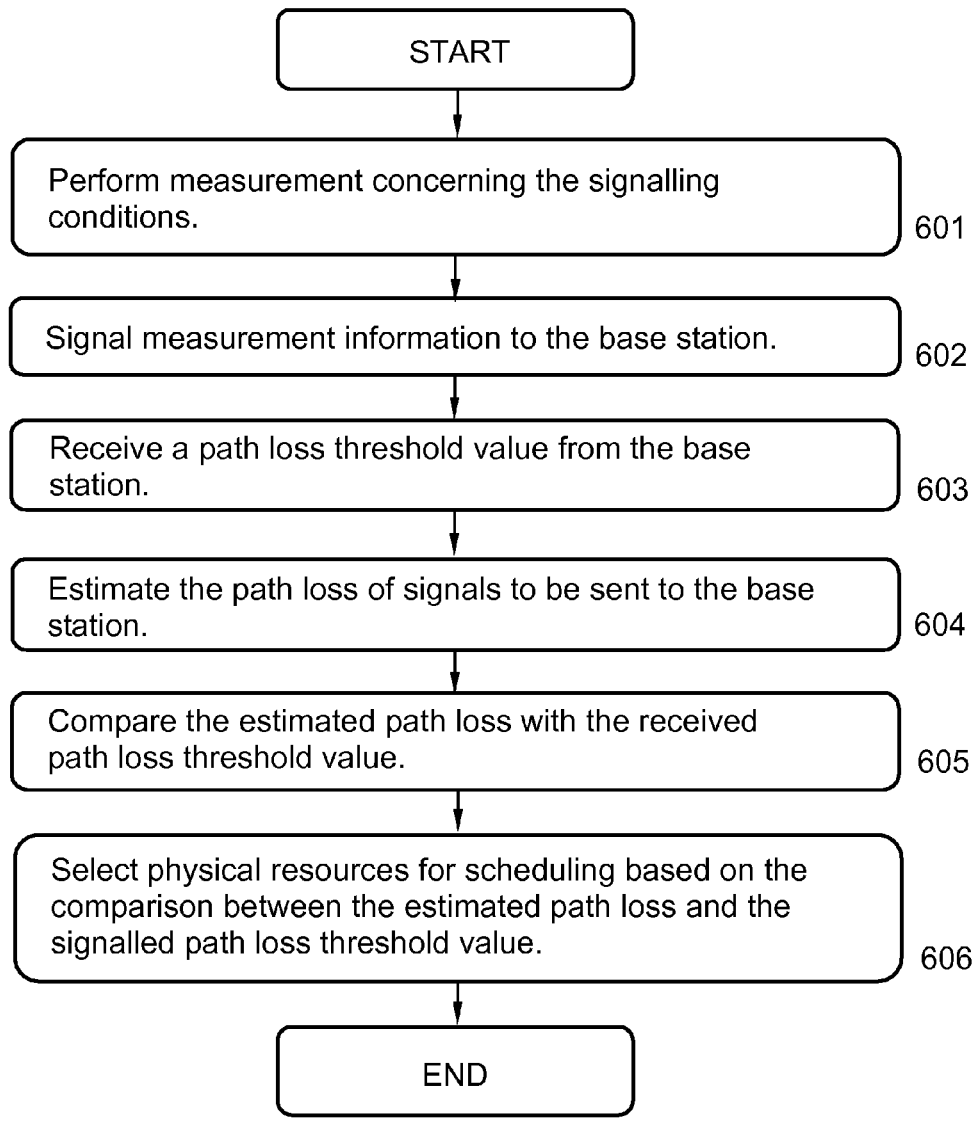
FIG. 6 is a flow chart illustrating embodiments of the present method in a user equipment.

FIG. 6 is a flow chart illustrating embodiments of method steps 601-606 performed in a user equipment 440. The method steps 601-606 aims at assisting a base station 410 in scheduling physical resources 200 in a transmission bandwidth, to the user equipment 440. The physical resources 200 to be scheduled may be e.g. physical channels or radio resource blocks 200. Some physical resources 200 within the transmission bandwidth are subjected to a performance requirement power restriction value. The performance requirement power restriction value may be e.g. a maximum power reduction value, an additional maximum power reduction value, the sum of the maximum power reduction value added to the additional maximum power reduction value, a power back off or additional spectrum emissions.

The user equipment 440 and the base station 410 may be comprised in a wireless communication system 430, which may be e.g. a LTE radio network and the base station 410 may be e.g. an evolved node B, eNB, according to some embodiments. The physical resources 200 to be scheduled may according to some embodiments comprise resource blocks in an OFDMA system 430 such as E-UTRAN. However, according to some embodiments the physical resources 200 to be scheduled may comprise CDMA channelization code in a CDMA system 430 such as WCDMA or CDMA2000. However, the physical resources 200 may, according to some embodiments comprise resource blocks 200 within a frequency band, which are subjected to a performance requirement power restriction value larger than a power restriction threshold limit value. Some resource blocks 200 may be subjected to a performance requirement power restriction value less than the power restriction threshold limit value. The physical resources 200 to be scheduled may however comprise Physical Random Access Channel (PRACH) resources, according to some embodiments.

To appropriately assist the base station 410 in scheduling physical resources 200 to the user equipment 440, the method may comprise a number of method steps 601-606.

It is however to be noted that some of the described method steps 601-606 are optional and only comprised within some embodiments. Further, it is to be noted that the method steps 601-606 may be performed in a somewhat different chronological order and that some of them, e.g. step 601 and step 603, may be performed simultaneously or in a rearranged chronological order. The method may comprise the following steps:

Step 601

This step is optional and may only be performed within some embodiments.

Measurements may be performed. The measurements may comprise any, some or all of e.g. transmit power, power headroom, buffer size of the user equipment 440, happy bit, path loss or signal strength.

Step 602

This step is optional and may only be performed within some embodiments.

The measurement information may be sent to the base station 410.

Step 603

A path loss threshold value is received from the base station 410.

Step 604

The path loss of signals to be sent to the base station 410 is estimated.

Step 605

The estimated path loss is compared with the received path loss threshold value.

Step 606

Physical resources 200 for scheduling are selected, based on the comparison between the estimated path loss and the signalled path loss threshold value.

Figure 7:
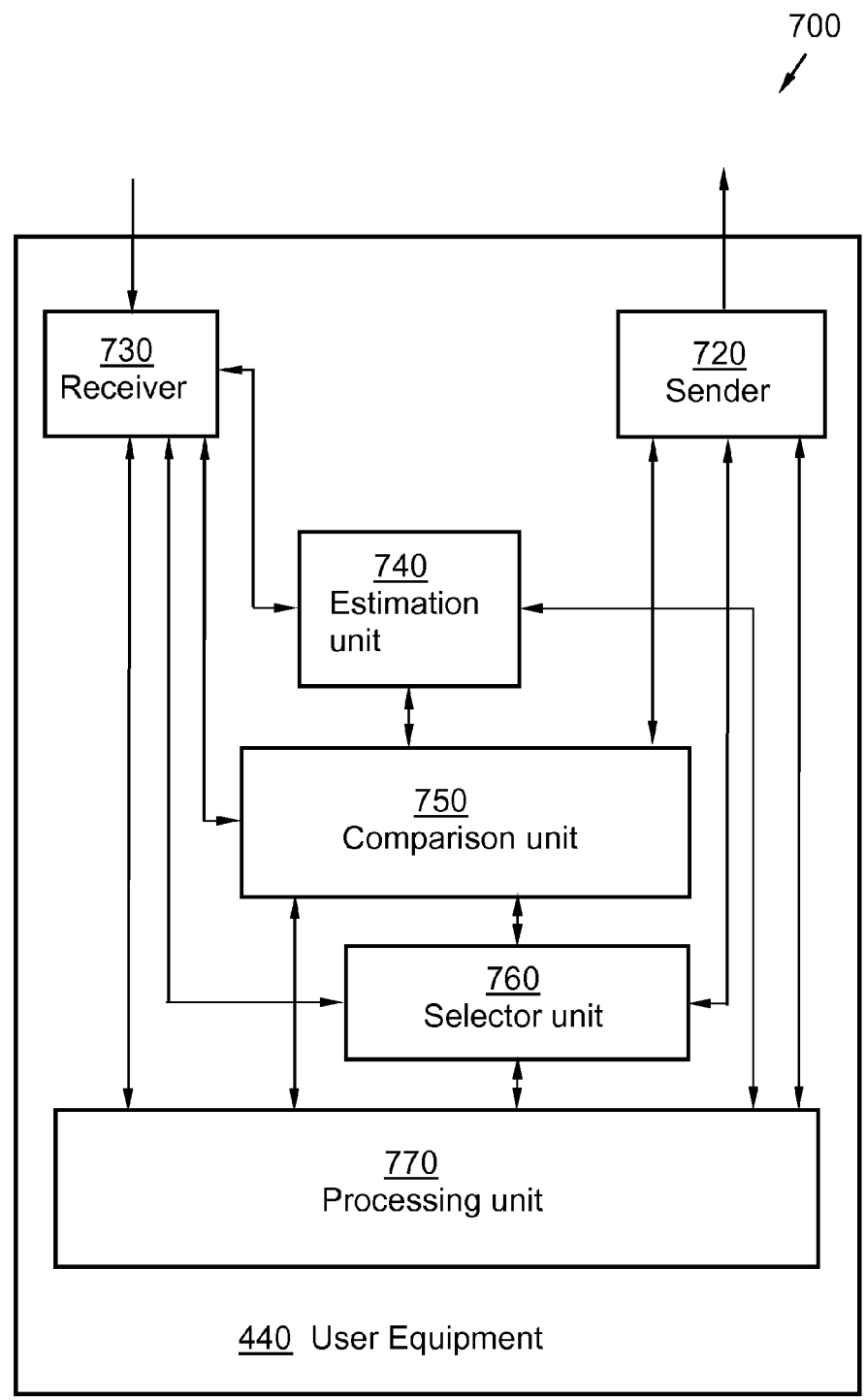
FIG. 7 is a schematic block diagram illustrating embodiments of a user equipment.

FIG. 7 schematically illustrates an arrangement 700 in a user equipment 440. The arrangement 700 is adapted to perform any, some or all of the method steps 601-606 in order to assist the base station 410 in scheduling physical resources 200 in a transmission bandwidth, to the user equipment 440. The physical resources 200 to schedule may be e.g. physical channels or radio resource blocks 200. Some physical resources 200 within the transmission bandwidth are subjected to a performance requirement power restriction value. The performance requirement power restriction value may be e.g. a maximum power reduction value, an additional maximum power reduction value, the sum of the maximum power reduction value added to the additional maximum power reduction value, a power back off or additional spectrum emissions.

The user equipment 440 and the base station 410 may be comprised in a wireless communication system 430, which may be e.g. a LTE radio network and the base station 410 may be e.g. an evolved node B, eNB, according to some embodiments. The physical resources 200 to be scheduled may according to some embodiments comprise resource blocks in an OFDMA system 430 such as E-UTRAN. However, according to some embodiments the physical resources 200 to be scheduled may comprise CDMA channelization code in a CDMA system 430 such as WCDMA or CDMA2000. However, the physical resources 200 may, according to some embodiments comprise resource blocks 200 within a frequency band, which are subjected to a performance requirement power restriction value larger than a power restriction threshold limit value. Some resource blocks 200 may be subjected to a performance requirement power restriction value less than the power restriction threshold limit value. The physical resources 200 to be scheduled may however comprise Physical Random Access Channel (PRACH) resources, according to some embodiments.

In order to perform the method steps 601-606 correctly, the user equipment arrangement 700 comprises a plurality of units such as e.g. a receiver 730. The receiver 730 is adapted to receive a path loss threshold value from the base station 410. Also, the arrangement 700 comprises an estimation unit 740. The estimation unit 740 is adapted to estimate the path loss of signals to be sent to the base station 410. Further, the arrangement 700 comprises a comparison unit 750. The comparison unit 750 is adapted to compare the estimated path loss with the received path loss threshold value. In further addition, the arrangement 700 comprises a selector unit 760. The selector unit 760 is adapted to select physical resources 200 for scheduling based on the comparison between the estimated path loss and the signalled path loss threshold value. Further, the arrangement 700 may optionally comprise a sender 720. The sender 720 may be adapted to send a radio signal to be received by the base station 410.

Optionally, the user equipment arrangement 700 further also may comprise a processing unit 770. The processing unit 770 may be represented by e.g. a Central Processing Unit (CPU), a processor, a microprocessor, or other processing logic that may interpret and execute instructions. The processing unit 770 may perform all data processing functions for inputting, outputting, and processing of data including data buffering and device control functions, such as call processing control, user interface control, or the like.

It is to be noted that any internal electronics of the user equipment 410 and/or the user equipment arrangement 700, not completely necessary for understanding the present method according to the method steps 601-606 has been omitted from FIG. 7, for clarity reasons.

Further, it is to be noted that some of the described units 720-770 comprised within the arrangement 700 in the user equipment 410 are to be regarded as separate logical entities but not with necessity separate physical entities. To mention just one example, the receiver 730 and the sender 720 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 410 and the user equipment 440 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 601-606 in the user equipment 440 may further be implemented through one or more processor units 770 in the user equipment 440, together with computer program code for performing the functions of the present method steps 601-606. Thus a computer program product, comprising instructions for performing the method steps 601-606 in the user equipment 440 may assist the base station 410 in scheduling physical resources 200 to the user equipment 440, when the computer program product is loaded into the processor unit 770.

The computer program product mentioned above may be provided for instance in the form of a data carrier carrying computer program code for performing the method steps according to the present solution when being loaded into the processor unit 770. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the user equipment 410 remotely, e.g. over an Internet or an intranet connection.

Further, a computer program product comprising instructions for performing at least some of the method steps 601-606 may be used for implementing the previously described method in the user equipment 440 for assisting a base station 410 in scheduling physical resources 200 to the user equipment 440, when the computer program product is run on the processing unit 770 comprised within the user equipment 410.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. Method in a base station for scheduling physical resources to a user equipment served by the base station, in a transmission bandwidth, wherein some physical resources within the transmission bandwidth are subjected to a performance requirement power restriction value, the method comprising:

scheduling physical resources based on the performance requirement power restriction value of the physical resources to be scheduled, wherein some physical resources within a frequency band are subjected to a performance requirement power restriction value larger than a power restriction threshold limit value, and some physical resources are subjected to a performance requirement power restriction value less than the power restriction threshold limit value, determining if the user equipment is to be prioritized or not, and, wherein the scheduling of the physical resources comprises scheduling physical resources that are subjected to a maximum power decrease less than the power restriction threshold limit value if the user equipment is determined to be prioritized, and scheduling physical resources that are subjected to a maximum power decrease exceeding the power restriction threshold limit value if the user equipment is not determined to be prioritized.

2. Method according to claim 1, wherein the physical resources to be scheduled comprise resource blocks in an Orthogonal Frequency Division Multiple Access (OFDMA) system.

3. Method according to claim 1, wherein the physical resources to be scheduled comprise Code Division Multiple Access (CDMA) channelization code or scheduling grants in a CDMA system.

4. Method according to claim 1, wherein the performance requirement power restriction value is based on any of a maximum power reduction value, an additional maximum power reduction value, a sum of the maximum power reduction value added to the additional maximum power reduction value, a power back off or additional spectrum emissions.

5. Method according to claim 1, further comprising:
signalling a path loss threshold value to the user equipment, and
wherein the user equipment is to be prioritized if an estimated path loss of the user equipment exceeds the signalled path loss threshold value.

6. Method according to claim 1, wherein determining if the user equipment is to be prioritized or not is based on one or more of the following criteria:
user equipment requiring a grant larger than a grant size threshold value as indicated by buffer size reports from the user equipment, and/or
user equipment with a path loss exceeding the path loss threshold value, as indicated by a transmit power report or a power headroom report being the difference between a maximum output power and a transmitted power in logarithmic scale of the user equipment, and/or
user equipment requesting a service with a data rate exceeding a data rate threshold value.

7. Method according to claim 1, wherein the physical resources to be scheduled comprises Physical Random Access Channel "PRACH" resources and the user equipment is to be prioritized if a PRACH resources is requested.

8. Method according to claim 1, wherein the physical resources to be scheduled comprises Physical Random Access Channel "PRACH" resources and the user equipment is to be prioritized if a handover access is to be scheduled.

9. Method in a base station for scheduling physical resources to a user equipment served by the base station, in a transmission bandwidth, wherein some physical resources within the transmission bandwidth are subjected to a performance requirement power restriction value, the method comprising:
receiving measurement information from the user equipment,
determining if the user equipment is to be prioritized or not, wherein the determining comprises estimating an actual transmit power of the user equipment, by computing a transmit power, based on the received measurement information and subtracting the performance requirement power restriction value of the physical resources to be scheduled to the user equipment, and only consider the user equipment to be prioritized when the estimated actual transmit power is bigger than an actual transmit power threshold value, and
scheduling physical resources based on the performance requirement power restriction value of the physical resources to be scheduled, wherein the scheduling of physical resources comprises only scheduling physical resources to the user equipment if the estimated actual transmit power of the user equipment exceeds the performance requirement power restriction value of the physical resources to be scheduled.

10. Method according to claim 9, wherein the measurement information received from the user equipment comprises one or more of the following measurements or reports: user equipment transmit power, user equipment power headroom being a difference between a maximum output power and a transmitted power in logarithmic scale of the user equipment, buffer size, happy bit indicating whether the user equipment is satisfied with current grant/physical resources or not, path loss and/or signal strength.

11. Arrangement in a base station for scheduling physical resources to a user equipment served by the base station, in a transmission bandwidth, wherein some physical resources within the transmission bandwidth are subjected to a performance requirement power restriction value, the arrangement comprising:
a scheduling unit, adapted to schedule physical resources based on the performance requirement power restriction value of the physical resources to be schedule, wherein some physical resources within a frequency band are subjected to a performance requirement power restriction value larger than a power restriction threshold limit value, and some physical resources are subjected to a performance requirement power restriction value less than the power restriction threshold limit value,
a determining unit adapted to determining if the user equipment is to be prioritized or not, and,
wherein the scheduling unit is further adapted to schedule the physical resources by scheduling physical resources that are subjected to a maximum power decrease less than the power restriction threshold limit value if the user equipment is determined to be prioritized, and scheduling physical resources that are subjected to a maximum power decrease exceeding the power restriction threshold limit value if the user equipment is not determined to be prioritized.

12. A base station configured for scheduling physical resources within a transmission bandwidth to a user equipment, the base station comprising:
one or more processor units that execute computer program code to enable following:
scheduling the physical resources based on a performance requirement power restriction value of the physical resources to be scheduled, wherein some physical resources within a frequency band are subjected to a performance requirement power restriction value larger than a power restriction threshold limit value, and some physical resources are subjected to a performance requirement power restriction value less than the power restriction threshold limit value, determining if the user equipment is to be prioritized or not, and, wherein the scheduling of the physical resources comprises scheduling physical resources that are subjected to a maximum power decrease less than the power restriction threshold limit value if the user equipment is determined to be prioritized, and scheduling physical resources that are subjected to a maximum power decrease exceeding the power restriction threshold limit value if the user equipment is not determined to be prioritized.

13. A base station configured for scheduling physical resources within a transmission bandwidth to a user equipment, the base station comprising:

one or more processor units that execute computer program code to enable following:

receiving measurement information from the user equipment, determining if the user equipment is to be prioritized or not, wherein the determining comprises estimating an actual transmit power of the user equipment, by computing a transmit power, based on the received measurement information and subtracting the performance requirement power restriction value of the physical resources to be scheduled to the user equipment, and only consider the user equipment to be prioritized when the estimated actual transmit power is bigger than an actual transmit power threshold value, and scheduling physical resources based on the performance requirement power restriction value of the physical resources to be scheduled, wherein the scheduling of physical resources comprises only scheduling physical resources to the user equipment if the estimated actual transmit power of the user equipment exceeds the performance requirement power restriction value of the physical resources to be scheduled.

\* \* \* \* \*

UNITED STATES PATENT AND TRADEMARK OFFICE
CERTIFICATE OF CORRECTION

| | |
|---|---|
| PATENT NO. | : 8,942,195 B2 |
| APPLICATION NO. | : 13/144635 |
| DATED | : January 27, 2015 |
| INVENTOR(S) | : Liu et al. |

It is certified that error appears in the above-identified patent and that said Letters Patent is hereby corrected as shown below:

In the Claims

In Column 19, Line 54, in Claim 7, delete ""PRACH"" and insert -- (PRACH) --, therefor.

In Column 19, Line 58, in Claim 8, delete ""PRACH"" and insert -- (PRACH) --, therefor.

Signed and Sealed this
Twenty-fifth Day of August, 2015

Michelle K. Lee
*Director of the United States Patent and Trademark Office*